(12) United States Patent
Anand et al.

(10) Patent No.: US 10,468,104 B1
(45) Date of Patent: Nov. 5, 2019

(54) ROBUST AND ERROR FREE PHYSICAL UNCLONABLE FUNCTION USING TWIN-CELL CHARGE TRAP TRANSISTOR MEMORY

(71) Applicant: GLOBALFOUNDRIES INC., Grand Cayman (KY)

(72) Inventors: Darren L. Anand, Williston, VT (US); William Roy John Corbin, Underhill, VT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 16/007,445

(22) Filed: Jun. 13, 2018

(51) Int. Cl.
| | |
|---|---|
| G11C 16/10 | (2006.01) |
| G11C 16/04 | (2006.01) |
| G11C 16/26 | (2006.01) |
| H04L 9/32 | (2006.01) |
| G11C 16/34 | (2006.01) |

(52) U.S. Cl.
CPC .......... *G11C 16/0466* (2013.01); *G11C 16/10* (2013.01); *G11C 16/26* (2013.01); *G11C 16/3459* (2013.01); *H04L 9/3278* (2013.01)

(58) Field of Classification Search
CPC ............................ G11C 16/0466; G11C 16/10
See application file for complete search history.

(56) References Cited

U.S. PATENT DOCUMENTS

| | | | |
|---|---|---|---|
| 8,525,549 B1 | 9/2013 | Feng et al. | |
| 8,619,979 B2* | 12/2013 | Ficke | H04L 9/3278 |
| | | | 380/44 |
| 8,971,527 B2 | 3/2015 | BrightSky et al. | |
| 9,082,514 B1 | 7/2015 | Trimberger | |
| 9,202,554 B2* | 12/2015 | Chu | G11C 29/06 |
| 9,418,745 B1* | 8/2016 | Chen | G11C 16/14 |
| 9,953,727 B1* | 4/2018 | Fifield | G11C 29/78 |
| 2015/0028847 A1 | 1/2015 | Vanhoucke et al. | |
| 2015/0278551 A1* | 10/2015 | Iyer | G06F 21/70 |
| | | | 726/2 |
| 2015/0349967 A1* | 12/2015 | Chen | H04L 9/3278 |
| | | | 713/193 |
| 2018/0191512 A1* | 7/2018 | Tomishima | G06F 21/72 |

OTHER PUBLICATIONS

Arunkumar Vijayakumar et al., "On Improving Reliability of SRAM-Based Physically Unclonable Functions", Journal of Low Power Electronics and Applications, Jan. 12, 2017, 15 pages.

Mudit Bhargava, "Reliable, Secure, Efficient Physical Unclonable Functions", Carnegie Mellon University Research Showcase @ CMU, Pittsburgh, Pennsylvania, 2013, 156 pages.

(Continued)

*Primary Examiner* — Mushfique Siddique
(74) *Attorney, Agent, or Firm* — Michael Le Strange; Andrew M. Calderon; Roberts Mlotkowski Safran Cole & Calderon, P.C.

(57) ABSTRACT

The present disclosure relates to a structure which includes a pair of non-volatile storage devices in a memory array which are sensed to determine an initial data state and reinforced by a write operation of the initial data state to the pair of non-volatile storage devices. The structure can be used for a robust and error free physical unclonable function.

16 Claims, 7 Drawing Sheets

(56) References Cited

OTHER PUBLICATIONS

Roel Maes et al., "Countering the Effects of Silicon Aging on SRAM PUFs", Proceedings of the 2014 IEEE International Symposium on Hardware-Oriented Security and Trust (HOST), May 2014, 7 pages.
Maximilian Hofer et al.,"A Microcontroller SRAM-PUF", in Network and System Security (NSS), 2011 5th International Conference Sep. 2011, 5 pages.
Maximilian Hofer et al., "Physical Unclonable Functions in Theory and Practice", Springer Science+Business Media New York 2013, 279 pages.

\* cited by examiner

ROBUST AND ERROR FREE PHYSICAL UNCLONABLE FUNCTION USING TWIN-CELL CHARGE TRAP TRANSISTOR MEMORY

FIELD OF THE INVENTION

The present disclosure relates to a physical unclonable function, and more particularly, to a circuit and a method for a physical unclonable function using a twin-cell charge trap transistor memory.

BACKGROUND

A physical unclonable function (PUF) is a physical entity that gives a response to a stimulus (i.e., the challenge). A PUF has three key properties: the function must be easy to evaluate (i.e., measure) from a stimulus (i.e., challenge), the function must be difficult to predict (i.e., random from PUF to PUF, or unclonable), and the function must be stable (i.e., repeatable) on any one device.

PUFs are critical in security applications, and are used in a variety of semiconductor products. For example, PUFs can be delay circuits. SRAM circuits, a differential pair circuit, a butterfly circuit, or a non-volatile memory. A PUF delay circuit leverages the randomness of circuit performance. A PUF SRAM circuit can use a preferred power-up state of cells to introduce variation. A PUF differential pair circuit uses a natural variation of two semiconductor circuits to create a random value. A PUF butterfly circuit uses logic latches to introduce variation. A PUF non-volatile memory uses various methods with write/erase steps, which leave the cells in random states that can be read out from the array. Further, the PUF non-volatile memory leverages variable cell response to identical write/erase conditions.

SUMMARY

In an aspect of the disclosure, a structure includes a pair of non-volatile storage devices in a memory array which are sensed to determine an initial data state and reinforced by a write operation of the initial data state to the pair of non-volatile storage devices.

In another aspect of the disclosure, a circuit includes a twin-cell charge trap transistor (CTT) non-volatile memory (NVM) array, and a read and write control and data compare component which is configured to read an initial data state of a memory address of the twin-cell CTT NVM array and write the initial data state to the memory address of the twin-cell CTT NVM array.

In another aspect of the disclosure, a method includes reading an initial data state from a memory address of a non-volatile memory, writing the read initial data state to the memory address of the non-volatile memory, and performing a check to determine whether the read initial date state was written correctly in the memory address of the non-volatile memory.

BRIEF DESCRIPTION OF THE DRAWINGS

The present disclosure is described in the detailed description which follows, in reference to the noted plurality of drawings by way of non-limiting examples of exemplary embodiments of the present disclosure.

DETAILED DESCRIPTION

The present disclosure relates to a physical unclonable function, and more particularly, to a circuit and a method for a physical unclonable function using a twin-cell charge trap transistor memory. More specifically, the present disclosure allows for a noise free physical unclonable function circuit. Advantageously, the structure of the present disclosure (i.e., twin-cell CTT based NVM) and method (re-enforcing an initially random but error prone state) enables a robust and error free (i.e., noise free) PUF. Further, in the present disclosure, the data written back into the NVM array is kept private on the chip to avoid third party trust concerns when programming the NVM.

In conventional circuitry, a noisy physical unclonable function (PUF) occurs due to environment and aging effects on the circuitry or devices. In particular, temperature, voltage, and circuit drift over time (e.g., bias temperature instability (BTI), electromagnetic (EM) energy, etc.) which can affect conventional PUF circuits and impact results. Many techniques in conventional circuitry have been developed to work around PUF noise. For example, these techniques include voting, margin sorting, error correction, etc., to improve or mitigate the PUF noise.

In contrast, the present disclosure enables a physical unclonable function (PUF) while solving the issue of PUF output errors (i.e., noise) through a method that uses a charge trap transistor (CTT) non-volatile memory (NVM). In the present disclosure, a CTI based NVM is based on twin-cell bit-cells and has a random initial state due to random device threshold voltage (i.e., Vth) variations. Further, in the present disclosure, the non-volatile memory includes a write function that enables the initial random state to be re-enforced with margin to be free from errors (i.e., noise) on subsequent accesses. In the present disclosure, the PUF can include any number of bits in an array at any set of addresses or bit locations.

Figure 1:
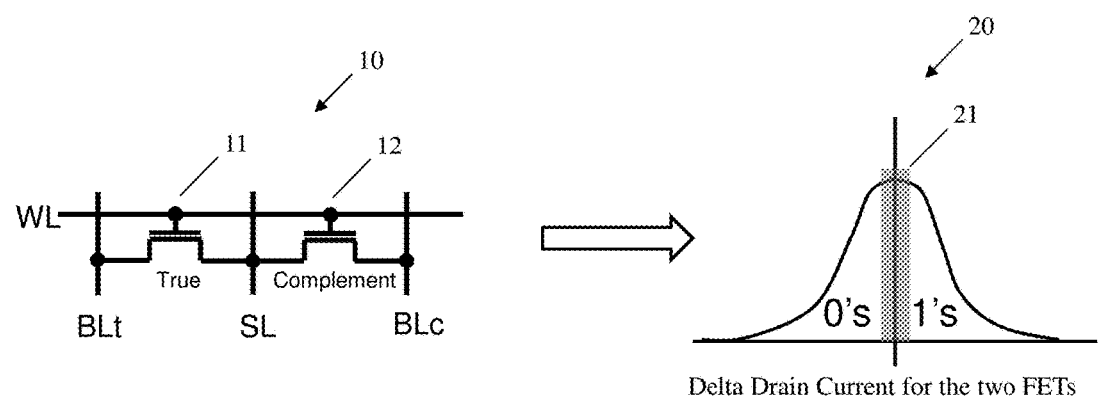
FIG. 1 shows a charge trap transistor physical unclonable function in accordance with aspects of the present disclosure.

FIG. 1 shows a charge trap transistor physical unclonable function in accordance with aspects of the present disclosure. In FIG. 1, a charge trap transistor physical unclonable function 10 includes a true transistor 11 and a complement transistor 12. In FIG. 1, the true transistor 11 is a NMOS transistor and has a source connected to a true bit line signal BLt, a drain connected to a source line SL, and a gate connected to a word line WL. Further, the complement transistor 12 is a NMOS transistor and has a source connected to the source line SL, a drain connected to a complement bit line signal BLc, and a gate connected to the word line WL. In another embodiment, the true transistor 11 and the complement transistor 12 can be PMOS transistors.

In FIG. 1, the charge trap transistor physical unclonable function 10 in a one time programmable memory (OTPM) which produces random initial data. The one time programmable memory (OTPM) can be, for example, a type of non-volatile memory (NVM). The charge trap transistor physical unclonable function 10 can be a twin cell architecture which compares two NMOS devices (i.e., true transistor 11 and complement transistor 12) and uses a threshold difference of the NMOS devices (i.e., true transistor 11 and complement transistor 12) to determine a '0' or '1' state. The random initial data produced is driven by intrinsic random threshold voltage Vth variations.

In FIG. 1, the charge trap transistor physical unclonable function 10 is easy to access by reading an array address or a set of array addresses. Further, accessing different regions of the array (i.e., different challenges) results in random data on each copy of the device. In other words, the value of the charge trap transistor physical unclonable function 10 cannot be predicted. Also, the charge trap transistor physical unclonable function 10 will have a robust and noise free physical unclonable function method using a charge trap transistor memory. In contrast, the conventional circuitry using differential state based physical unclonable functions (e.g., SRAM, differential pair, butterfly devices, etc.) will have noise from environmental variation and bits with a very small threshold voltage difference.

In FIG. 1, the natural variations in the true transistor 11 and the complement transistor 12 will result in random cell mismatches and, therefore, random data 21. As indicated by the arrow in FIG. 1, the result of these random cell mismatches produce random data 21 (i.e., shaded area) shown in a graph 20 of the delta drain current for the two field effect transistors (FETs). The random data 21 represents the mismatch between threshold voltages of the true transistor 11 and the complement transistor 12. The random data 21 (i.e., shaded area) shows very small differences that cannot be reliably read and which may produce noise in the physical unclonable function (PUF).

Figure 2:
FIG. 2 shows a random bit-map from a charge trap transistor based twin-cell in accordance with aspects of the present disclosure.

FIG. 2 shows a random bit-map from a charge trap transistor based twin-cell in accordance with aspects of the present disclosure. In FIG. 2, the random bit-map 30 is from a charge trap transistor based twin cell one time programmable memory (OTPM). The random bit-map 30 corresponds with the random data 21 in FIG. 1. This random bit-map includes a random pattern (i.e., black corresponds to a "1" value and white corresponds to a "0" value) which corresponds with the mismatch between threshold voltages of the true transistor 11 and the complement transistor 12 in FIG. 1.

The present disclosure addresses the noise issue by programming the charge trap transistor physical unclonable function 10 twin cell array with data returned from a read operation (i.e., the challenge) or a function of that data. In particular, the present disclosure may include reading random data from a selected region of a charge trap transistor memory array. The data that is read (i.e., the PUF response) may not be stable with respect to voltage, temperature, and age. The data from the read operation is then written back into the charge trap transistor memory array to be stored with margin. In embodiments of the present disclosure, this write operation is performed by an on chip state machine in order to keep the PUF data secure within the device. If the write operation is not performed by an on chip state machine, then a trusted third party would perform the write operation in the non-volatile memory.

In the present disclosure, the write operation will strengthen the initial random state to make the function repeatable. Further, writing the random data pattern (e.g., the random bit-map 30) back into the CTT memory array will cause the CTT memory array to be 100% stable. The physical unclonable function of the present disclosure will now be stable at any condition or age within the lifetime and use condition specifications of the non-volatile memory. In other words, the CTT memory array will allow for a completely noise free PUF circuit. The stability of the PUF circuit may be limited to the application condition and volatility specification of the non-volatile memory (NVM). Therefore, the present disclosure is different from conventional circuitry, in which the PUF noise is merely mitigated or reduced.

Figure 3:
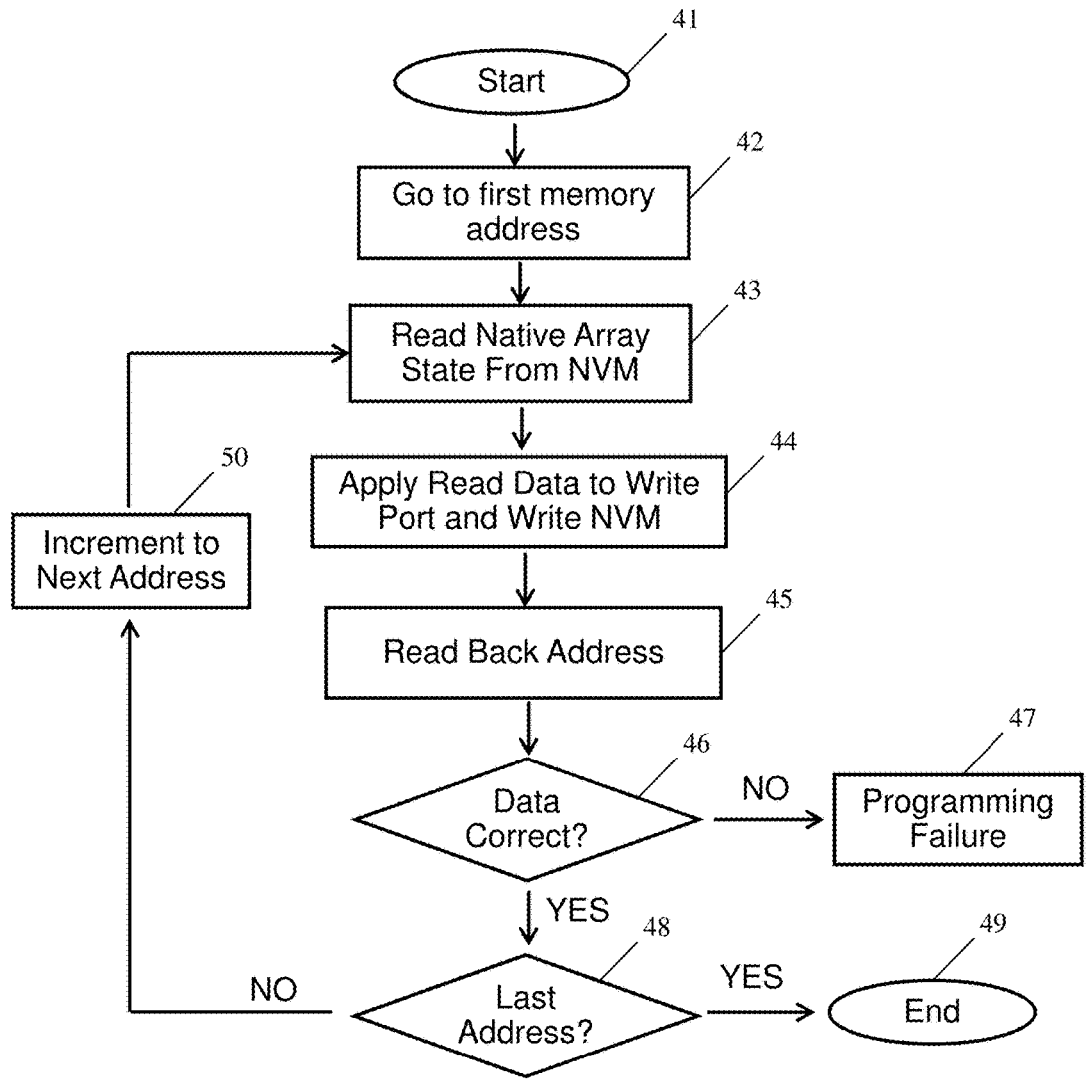
FIG. 3 shows a method for a secure physical unclonable function in accordance with aspects of the present disclosure.

FIG. 3 shows a method for a secure physical unclonable function in accordance with aspects of the present disclosure. The method of FIG. 3 can be performed by the system of FIG. 4, for example. At step 41, the method starts. At step 42, the method goes to a first memory address. Then, at step 43, the native array state (i.e., random initial state) is read from the first memory address of a non-volatile memory. At step 44, the read data is applied to a write port and then a write operation is performed to the first memory address of the non-volatile memory. At step 45, the first memory address of the non-volatile memory is read back to ensure that the read data was written properly.

Still referring to FIG. 3, at step 46, a check is performed to ensure that the data was correct. If the data was not correct, at step 47, a programming failure is triggered and output. If the data was correct, at step 48, another check is performed to see if this is the last address of the non-volatile memory. If this is the last address of the non-volatile memory, the process ends at step 49 and the physical unclonable function is now in a robust error free state. If this is not the last address of the non-volatile memory, the address is incremented to the next memory address at step 50, and the process repeats using steps 43-48 for the next memory address.

Figure 4:
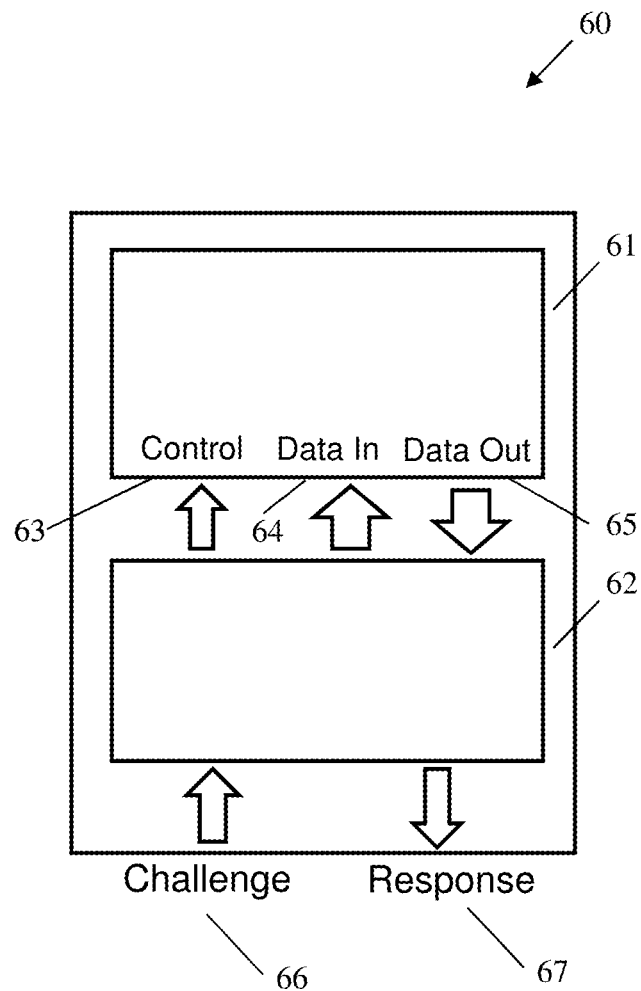
FIG. 4 shows a system for a secure physical unclonable function in accordance with aspects of the present disclosure.

FIG. 4 shows a system for a secure physical unclonable function in accordance with aspects of the present disclosure. In FIG. 4, the system for a secure physical unclonable function 60 includes a one time programmable memory non-volatile memory (OTPM NVM) 61 with a control port 63, a data input port 64, a data output port 65 and a read/write control and data compare 62 with a challenge port 66 and a response port 67. In comparison to the conventional circuitry, the read/write control and data compare 62 is added to allow for a physical unclonable function with a robust error free state.

In FIG. 4, the system 60 will go to a first memory address of the one time programmable memory non-volatile memory 61. Then, the read/write control and data compare 62 will read the native array state (i.e., the random initial state) of the first memory address of the OTPM NVM 61. Then, the read/write control and data compare 62 will apply the read data (i.e., the random initial state) to the write port and write the first memory address of the OTPM NVM 61 through the data input port 64. During the write operation, the response port 67 is disabled to keep the physical unclonable function secure. Further, the challenge port 66 enables access to the physical unclonable function response port 67 when not being programmed (i.e., not performing a write operation). The read/write control and data compare 62 will then read back the first memory address of the OTPM NVM 61.

Still referring to FIG. 4, the read/write control and data compare 62 will compare/check to ensure that the read data is correct. If the read/write control and data compare 62 determines that the read data is not correct, a programming failure will be triggered and output. If the read/write control and data compare 62 determines that the read data is correct, the read/write control and data compare 62 further determines if this is the last address of the OTPM NVM 61. If the read/write control and data compare 62 determines that this is the last address, then the process ends and the physical unclonable function is in a robust and error free state. If the read/write control and data compare 62 determines that this is not the last address, then the address is incremented to the next address. Then, the process is then repeated from the step of the read/write control and data reading the native array state (i.e., the random initial state) of the next memory address of the OTPM NVM 61.

Figure 5:
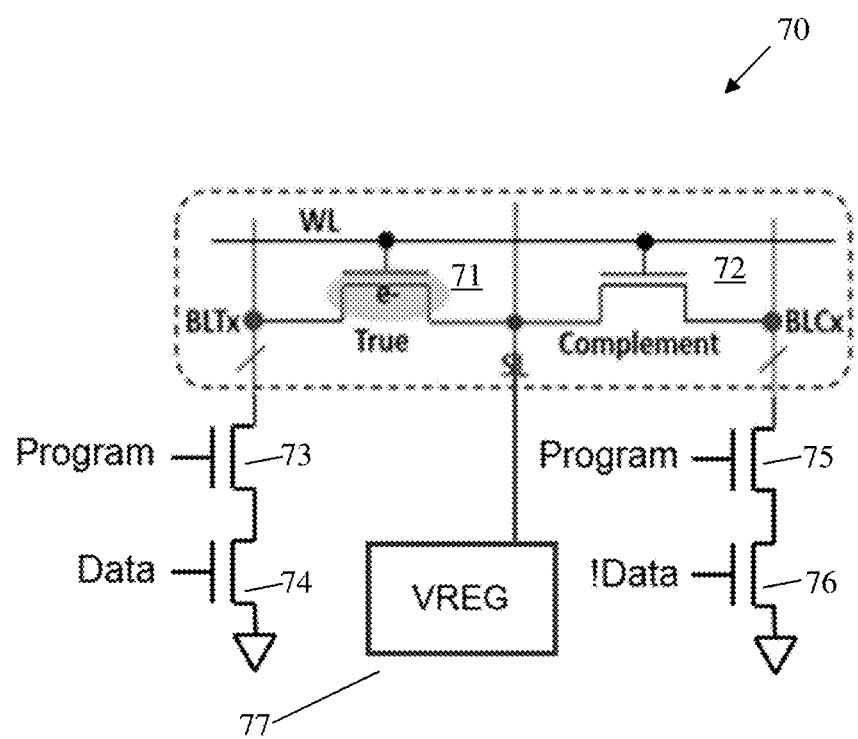
FIG. 5 shows a one time programmable memory cell coupled to a write circuit and a read circuit with a physical unclonable function in accordance with aspects of the present disclosure.

FIG. 5 shows a one time programmable memory cell coupled to a write circuit and a read circuit with a physical unclonable function in accordance with aspects of the present disclosure. In FIG. 5, the one time programmable memory cell coupled to a write circuit and a read circuit with a physical unclonable function 70 includes a true transistor 71, a complement transistor 72, program transistors 73, 75, data transistors 74, 76, and a voltage regulator 77. The true transistor 71, the complement transistor 72, the program transistors 73, 75, and the data transistors 74, 76 are NMOS transistors. In another embodiment, the true transistor 71 and the complement transistor 72 can be PMOS transistors.

The true transistor 71 has a source connected to a true bit line BLTx, a drain connected to a source line SL, and a gate connected to a word line WL. The complement transistor 72 has a source connected to the source line SL, a drain connected to a complement bit line BLCx, and a gate connected to the word line WL. The program transistor 73 has a drain connected to the true bit line BLTx, a source connected to a drain of the data transistor 74, and a gate connected to a program line Program. The data transistor 74 has a source connected to ground and a gate connected to a data line Data. The program transistor 75 has a drain connected to the complement bit line BLCx, a source connected to a drain of the data transistor 76, and a gate connected to the program line Program. The data transistor 76 has a source connected to ground and a gate connected to the complement of the data line Data (i.e., !Data). Lastly, the voltage regulator 77 is connected to the source line SL.

In FIG. 5, to write a cell in the one time programmable memory cell coupled to a write circuit and a read circuit with a physical unclonable function 70, the source line is high, one bit line (either BLTx or BLCx) is grounded and the other bit line (the other of BLTx or BLCx) is floating. Further, in the write operation of the cell 70 in FIG. 5, the write line WL is a high voltage and a regulated voltage is provided through the voltage regulator 77, which traps electrons in one of the true transistor 71 and the complement transistor 72 to create a differential threshold voltage (Vth) between the true transistor 71 and the complement transistor 72, which is sensed as a differential current by a read circuit 80. The voltage and timing is controlled by the OTPM.

Figure 6:
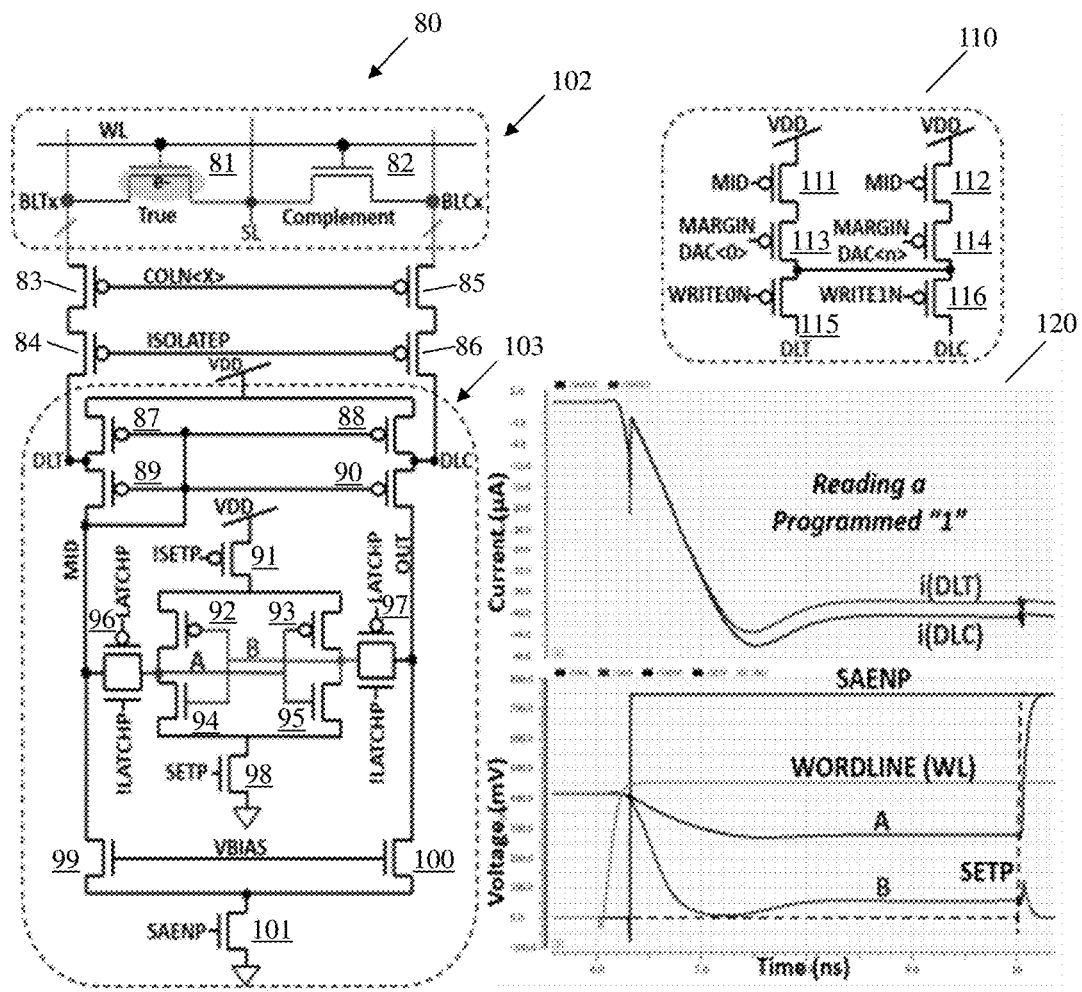
FIG. 6 shows a read circuit, a write margin circuit, and a graph for the one time programmable memory with a physical unclonable function in accordance with aspects of the present disclosure.

FIG. 6 shows a read circuit, a write margin circuit, and a graph for the one time programmable memory with a physical unclonable function in accordance with aspects of the present disclosure. More specifically, FIG. 6 includes a read circuit 80, a write margin circuit 110, and a graph for the one time programmable memory with a physical unclonable function 120. Further, the read circuit 80 includes a one time programmable memory twin cell 102 and a one time programmable memory differential current sense amplifier 103. The one time programmable memory differential current sense amplifier 103 is used to read a state of the charge trap transistor twin cells (e.g., the one time programmable memory twin cell 102) in an one time programmable memory array.

In FIG. 6, the one time programmable memory twin cell 102 includes a true transistor 81 and a complement transistor 82. The true transistor 81 includes a source connected to a true bit line BLTx, a drain connected to a source line SL, and a gate connected to a word line WL. Further, the complement transistor 82 includes a source connected to the source line SL, a drain connected to a complement bit line BLCx, and a gate connected to the word line WL. The true transistor 81 and the complement transistor 82 are NMOS transistors. In another embodiment, the true transistor 81 and the complement transistor 82 can be PMOS transistors.

The read circuit 80 includes a first bit switch transistor 83, a second bit switch transistor 85, a first protect transistor 84, and a second protect transistor 86. The first bit switch transistor 83 includes a source connected to the true bit line BLTx, a drain connected to a source of the first protect transistor 84, and a gate connected to a column line coln<x>. The second bit switch transistor 85 includes a source connected to the complement bit line BLCx, a drain connected to a source of the second protect transistor 86, and a gate connected to the column line coln<x>. The first protect transistor 84 includes a drain connected to a true digit line DLT and a gate connected to isolate signal isolatep. The second protect transistor 86 includes a drain connected to a complement digit line DLC and the gate connected to the isolate signal isolatep. The first bit switch transistor 83, the second bit switch transistor 85, the first protect transistor 84, and the second protect transistor 86 are PMOS transistors.

In FIG. 6, the one time programmable memory differential current sense amplifier 103 includes the following components: a first sense amplifier transistor 87; a second sense amplifier transistor 88; a third sense amplifier transistor 89; a fourth sense amplifier transistor 90; a first set transistor 91; a fifth sense amplifier transistor 92; a sixth sense amplifier transistor 93; a seventh sense amplifier transistor 94; an eighth sense amplifier transistor 95; a first latch 96; a second latch 97; a second set transistor 98; a ninth sense amplifier transistor 99; a tenth sense amplifier transistor 100; and an eleventh sense amplifier transistor 101.

The first sense amplifier transistor 87 includes a source connected to a voltage power supply VDD, a drain connected to the true digit line DLT, and a gate connected to a gate of the second sense amplifier transistor 88. The second sense amplifier transistor 88 includes a source connected to the voltage power supply VDD and a drain connected to the complement digit line DLC. The third sense amplifier transistor 89 includes a source connected to the true digit line DLT, a drain connected to a MID line, and a gate connected to a gate of the fourth sense amplifier transistor 90. The fourth sense amplifier transistor 90 includes a source connected to the complement digit line DLC and a drain connected to an out line OUT.

The first set transistor 91 includes a source connected to the voltage power supply VDD, a drain connected to a source of the fifth sense amplifier transistor 92, and a gate connected to the complement of a set signal SETP (i.e., !SETP). The fifth sense amplifier transistor 92 includes a drain connected to node A and a gate connected to a gate of the seventh sense amplifier transistor 94. The sixth sense amplifier transistor 93 includes a source connected to a drain of the first set transistor 91, a drain connected to a drain of the eighth sense amplifier transistor 95, and a gate connected to a gate of the eight sense amplifier transistor 95. The seventh sense amplifier transistor 94 includes a drain connected to the node A and a source connected to a drain of the second set transistor 98. The eighth sense amplifier transistor 95 includes a drain connected to the node B and a source connected to the drain of the second set transistor 98. The second set transistor 98 includes a source connected to ground and a gate connected to the set signal SETP. The second set transistor 98 is a set device, and is set by the set signal SETP and provides a connection to ground during a sensing operation. Further, the first latch 96 and the second latch 97 are used to latch a differential voltage of the one time programmable memory twin cell 102.

The ninth sense amplifier transistor 99 includes a drain connected to the MID line, a source connected to a drain of the eleventh sense amplifier transistor 101, and a gate connected to a bias voltage line VBIAS. The tenth sense amplifier 100 includes a drain connected to the out line OUT, a source connected to the drain of the eleventh sense amplifier transistor 101, and a gate connected to the bias voltage line VBIAS. The eleventh sense amplifier transistor 101 includes a source connected to the ground and a gate connected to a sense amplifier enable signal SAENP.

In FIG. 6, the one time programmable memory twin cell 102 produces a differential voltage by a similar process as the one time programmable memory cell coupled to a write circuit and a read circuit with a physical unclonable function 70. In other words, electrons are trapped in one of the true transistor 81 and the complement transistor 82 to create a differential voltage between the true transistor 81 and the complement transistor 82. The one time programmable memory differential current sense amplifier 103 senses a differential current from the one time programmable memory twin cell 102 through the true digit line DLT and the complement digit line DLC. The one time programmable memory differential current sense amplifier 103 will amplify the result on the out line OUT. The one time programmable memory differential current sense amplifier 103 will convert the differential current into a full digital "1" or full digital "0" level (e.g., a Vdd level "1" or a ground level "0") and latch an amplified differential voltage through the first latch 96 and the second latch 97 to provide a full digital output level. After a result is latched, an ISOLATEP signal will be set, which will isolate the one time programmable memory twin cell 102 from the one time programmable memory differential current sense amplifier 103. By isolating these circuits, it is possible to prevent changes to a value of the latched result.

When the one time programmable memory twin cell 102 is accessed with a high threshold voltage on the BLTx and a lower threshold voltage on the BLCx, node MID falls in response to a common-mode current, and the output OUT is pulled towards ground. On the other hand, when the one time programmable memory twin cell 102 is accessed with a high threshold voltage on the BLCx and a lower threshold voltage on the BLTx, node MID fails in response to the common-mode current, and the output OUT has a positive voltage difference.

Still referring to FIG. 6, the write margin circuit 110 includes a first margin transistor 111, a second margin transistor 112, a third margin transistor 113, a fourth margin transistor 114, a fifth margin transistor 115, and a sixth margin transistor 116. The first margin transistor 111 includes a source connected to the voltage power supply VDD, a drain connected to a source of the third margin transistor 113, and a gate connected to the MID line. The second margin transistor 112 includes a source connected to the voltage power supply VDD, a drain connected to a source of the fourth margin transistor 114, a gate connected to the MID line. The third margin transistor 113 includes a drain connected to a source of the fifth margin transistor 115 and a gate connected to the margin dac<0>. The fourth margin transistor 114 includes a drain connected to a source of the sixth margin transistors 116 and a gate connected to the margin dac<0>. The fifth margin transistor 115 includes a drain connected to the true digit line DLT and a gate connected to a write0n signal. The sixth margin transistor 116 includes a drain connected to the complement digit line DLC and a gate connected to a write in signal.

The write margin circuit 110 is used to add a margin to the voltage differential of the one time programmable memory twin cell 102. By adding the margin to the voltage differential of the one time programmable memory twin cell 102, the one time programmable memory differential current sense amplifier is imbalanced to favor either the true digit line DLT or the complement digit line DLC going high to indicate a "0" or "1" digital value.

In FIG. 6, a graph 120 is shown for the one time programmable memory with a physical unclonable function. The graph 120 shows a current for a true digit line DLT and a complement digit line DLC plotted against time in nanoseconds when reading a programmed "1". Further, the graph 120 shows a voltage for a sense amplifier enable signal SAENP, a wordline WL, a signal at Node A, a signal at Node B, and a set signal SETP plotted against time in nanoseconds when reading a programmed "1".

Figure 7:
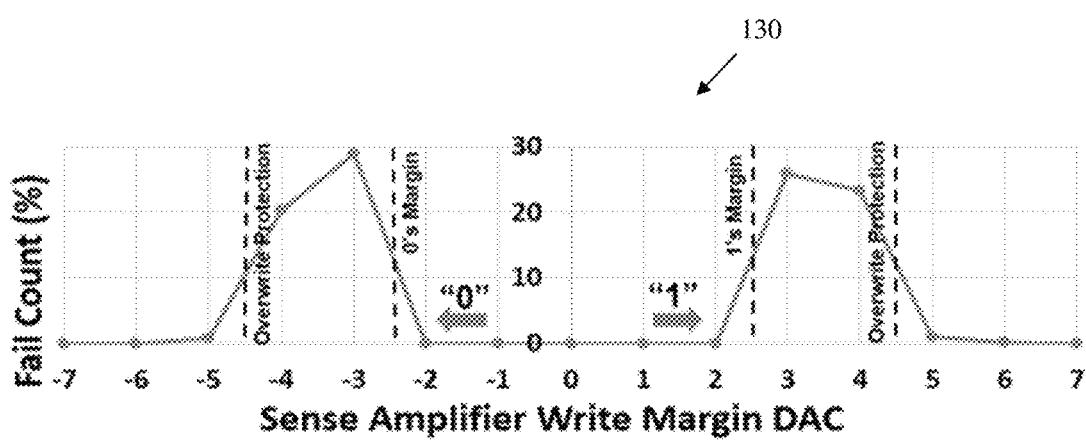
FIG. 7 shows another graph for the one time programmable memory with a physical unclonable function in accordance with aspects of the present disclosure.

FIG. 7 shows a graph for the one time programmable memory with a physical unclonable function in accordance with aspects of the present disclosure. In the graph 130 of FIG. 7, the x-axis shows the sense amplifier write margin with a digital adjustment increment DAC and the y-axis shows the percentage of a fail count. After writing (i.e., programming), the sense amplifier offset data in the graph 130 shows a robust signal for both 0's and 1's with no cells near the balance point (i.e., 0 on the x-axis). Thus, the graph 130 shows a robust PUF state that meets the memory operation criteria for operating conditions and operating lifetime. Further, before writing (i.e., at a T0 state), the distribution would be similar to the graph 20 of FIG. 1, in which both 0's and 1's have most cells near the balance point (i.e., 0 on the x-axis). In contrast, the conventional circuitry has greater fail counts near the zero balance point on the x-axis than the present disclosure.

The circuit and method for a physical unclonable function using a twin-cell charge trap transistor memory of the present disclosure can be manufactured in a number of ways using a number of different tools. In general, though, the methodologies and tools are used to form structures with dimensions in the micrometer and nanometer scale. The methodologies, i.e., technologies, employed to manufacture the circuit and method for a physical unclonable function using a twin-cell charge trap transistor memory of the present disclosure has been adopted from integrated circuit (IC) technology. For example, the structures are built on wafers and are realized in films of material patterned by photolithographic processes on the top of a wafer. In particular, the fabrication of the circuit and method for a physical unclonable function using a twin-cell charge trap transistor memory uses three basic building blocks: (i) deposition of thin films of material on a substrate, (ii) applying a patterned mask on top of the films by photolithographic imaging, and (iii) etching the films selectively to the mask.

The method(s) as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A structure comprising:
   a pair of non-volatile storage devices in a memory array which are sensed to determine an initial data state and reinforced by a write operation of the initial data state to the pair of non-volatile storage devices;
   a current sense amplifier which is connected to the pair of non-volatile storage devices through a true bit line (BLT) and a complement bit line (BLC) and which senses the initial data state of the pair of non-volatile storage devices;
   a write margin circuit which is connected to the current sense amplifier through a true digit line, a complement digit line, and a MID line,
   wherein the write margin circuit includes a plurality of PMOS transistors which are configured to add a margin to a difference in a threshold voltage between the pair of non-volatile storage devices.

2. The structure of claim 1, wherein the pair of non-volatile storage devices comprises a pair of field effect transistors (FETs).

3. The structure of claim 2, wherein the pair of FETs comprises a first NMOS transistor and a second NMOS transistor.

4. The structure of claim 3, wherein the initial data state comprises the difference in the threshold voltage between the first NMOS transistor and the second NMOS transistor.

5. The structure of claim 4, wherein the initial data state is determined by comparing a current from drain to source between the first NMOS transistor and the second NMOS transistor.

6. The structure of claim 3, wherein the write operation includes trapping charge in a gate dielectric of one of the first NMOS transistor and the second NMOS transistor.

7. The structure of claim 2, wherein the pair of FETs comprises a first PMOS transistor and a second PMOS transistor.

8. A circuit, comprising:
   a twin-cell charge trap transistor (CTT) non-volatile memory (NVM) array;
   a read and write control and data compare component which is configured to read an initial data state of a memory address of the twin-cell CTT NVM array and write the initial data state to the memory address of the twin-cell CTT NVM array;
   a current sense amplifier which is connected to the twin-cell CTT NVM array through a true bit line (BLT) and a complement bit line (BLC) and which senses the initial data state of the memory address of the twin-cell CTT NVM array; and
   a write margin circuit which is connected to the current sense amplifier through a true digit line, a complement digit line, and a MID line,
   wherein the write margin circuit includes a plurality of PMOS transistors which add a margin to a difference in a threshold voltage between the twin-cell CTT NVM array.

9. The circuit of claim 8, wherein the memory address comprises a pair of field effect transistors (FETs).

10. The circuit of claim 9, wherein the pair of FETs comprises a first NMOS transistor and a second NMOS transistor.

11. The circuit of claim 10, wherein the initial data state comprises the difference in the threshold voltage between the first NMOS transistor and the second NMOS transistor.

12. The circuit of claim 11, wherein the initial data state is read by comparing a current from drain to source between the first NMOS transistor and the second NMOS transistor.

13. The circuit of claim 10, wherein the writing the initial data includes trapping charge in a gate dielectric of one of the first NMOS transistor and the second NMOS transistor.

14. A method, comprising:
   reading an initial data state from a memory address of a non-volatile memory;
   writing the read initial data state to the memory address of the non-volatile memory;
   performing a check to determine whether the read initial data state was written correctly in the memory address of the non-volatile memory; and
   adding a margin to a difference in a threshold voltage between a plurality of devices in the non-volatile memory.

15. The method of claim 14, further comprising triggering and outputting a programming failure in response to determining that the read initial data state was not written correctly in the memory address of the non-volatile memory.

16. The method of claim 14, further comprising:
   determining whether the memory address is a last memory address of the non-volatile memory in response to determining that the read initial data state was written correctly in the memory address of the non-volatile memory; and
   incrementing to a next memory address in response to determining that the memory address is not the last memory address of the non-volatile memory.

* * * * *